United States Patent Office 3,523,643
Patented Aug. 11, 1970

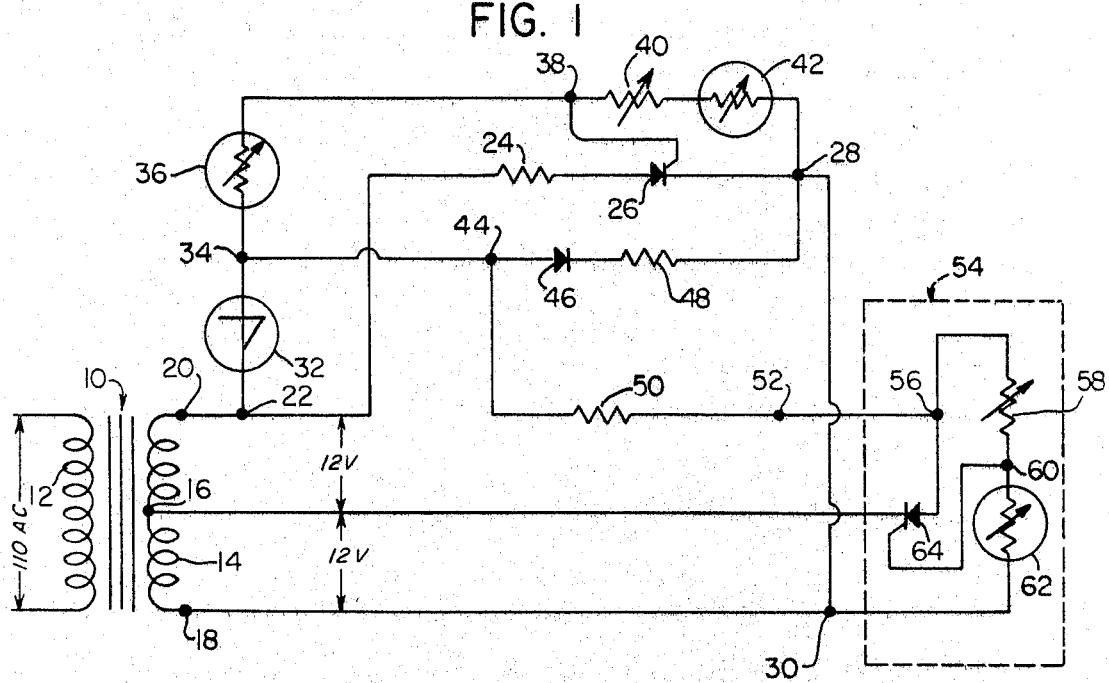
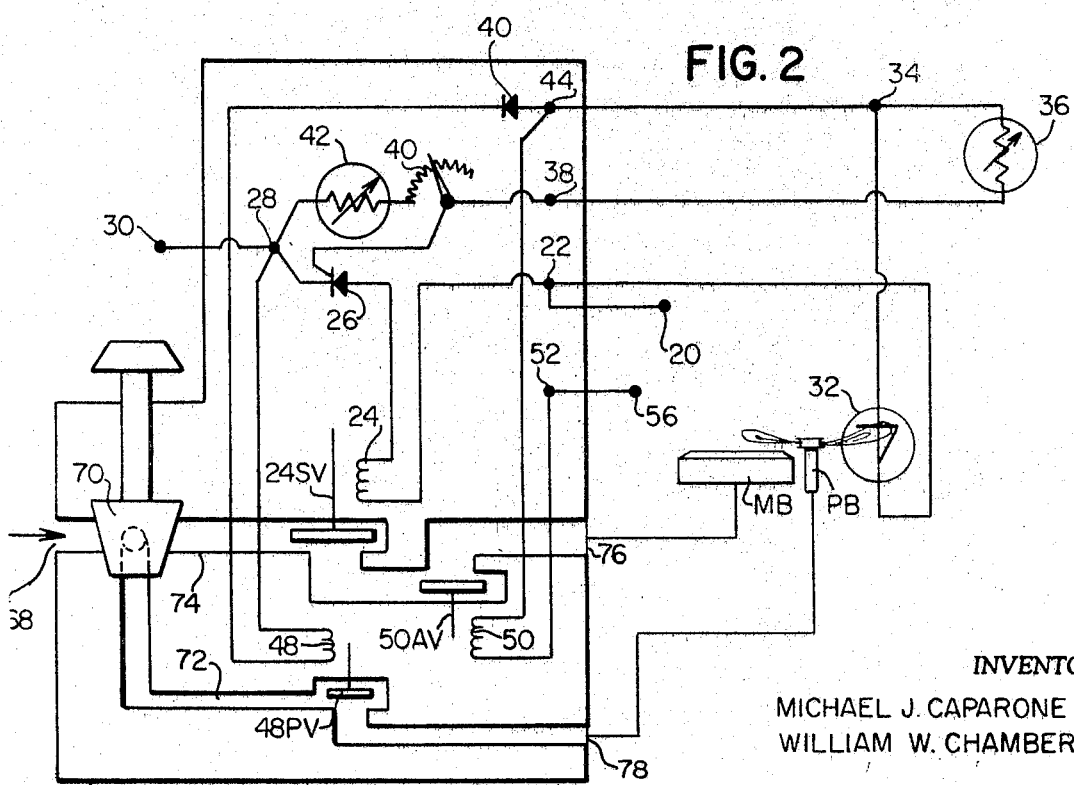

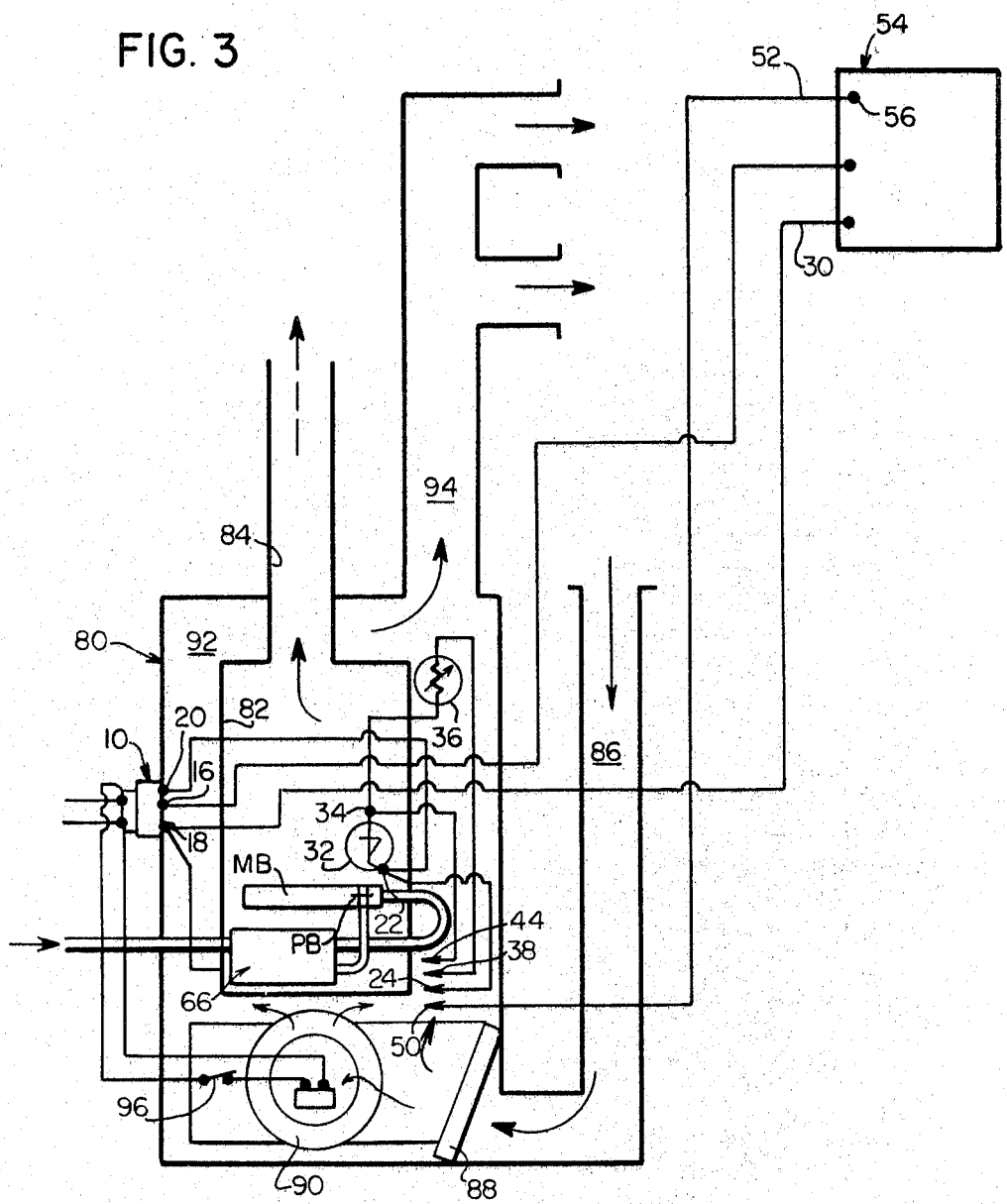

3,523,643
TEMPERATURE CONTROL SYSTEM WITH RECYCLING HIGH LIMIT
Michael J. Caparone, Arcadia, and William W. Chambers, Anaheim, Calif., assignors to Robertshaw Controls Company, Richmond, Va., a corporation of Delaware
Filed Jan. 12, 1968, Ser. No. 697,431
Int. Cl. F23n 3/06
U.S. Cl. 236—9    17 Claims

ABSTRACT OF THE DISCLOSURE

A temperature control system for burner apparatus having main and pilot burners with a control for the pilot burner, an automatic control responsive to thermostatic means for the main burner and a safety control for the main burner operating independently of the automatic control, wherein a high limit temperature responsive means is included in an electric circuit having a silicon controlled rectifier electrically connected to the safety control with its gate electrode controlled by the high limit temperature responsive means whereby the safety control is actuated in accordance with voltage at the gate electrode.

---

This invention relates to temperature responsive control systems, such as are utilized in heating and/or cooling systems which are automatically controlled to maintain a desired temperature.

In a conventional temperature control system of the automatic controlled type, an automatic main valve which is responsive to a thermostat in the area to be heated or cooled, selectively controls fuel flow to a burner. The thermostat is set at the desired temperature for a heating system and when the temperature in the area to be heated is above the set temperature the valve will be closed in response to the thermostat. When the temperature in the area to be heated drops below the set temperature the valve will be opened in response to the thermostat. To protect against excessive temperatures, it has been conventional to use a switch which is responsive to a high-limit temperature to close the automatic main valve to thereby shut down the system. This solution to high temperature protection is of limited effectiveness because, although it will adequately protect against excessive temperatures due to clogged filters and/or fan motor failure, it will not protect against a malfunctioning automatic main valve. That is, in the conventional excessive temperature protection system where the cause of the excessive same valve must be relied on to remedy the situation, and of course, since such valve is inoperative, the excessive temperature cause is not remedied.

It is, therefore, an object of the present invention to provide a temperature control system with a safety control that operates independently of its normal thermostatically operated control.

Another object of this invention is to reset automatically an abnormal temperature safety control in a temperature control system.

The present invention has another object in that the safety control of a temperature control system is cyclically actuated in accordance with the gate voltage of a silicon controlled rectifier, which voltage is varied by an abnormal temperature responsive thermistor.

In accordance with the present invention, a temperature control system includes main and pilot burners, a pilot control for the pilot burner, a thermostatically operated automatic control for the main burner, a safety control for controlling operation of the main burner independently of the automatic control, and an abnormal temperature responsive device connected with the safety control whereby the safety control is actuated in response to the abnormal temperature responsive device.

Additional objects and advantages of the present invention will become apparent from the following description taken in conjunction with the accompanying drawings wherein:

FIG. 1 is a schematic diagram of the electrical circuitry embodying the present invention;

FIG. 2 is a schematic diagram of control apparatus with connections for certain parts of the circuitry of FIG. 1; and FIG. 3 is a schematic diagram of a heating system with the control circuitry and apparatus of FIGS. 1 and 2.

The electrical circuitry for the present invention, as shown in FIG. 1, includes a transformer 10 having a primary coil 12 and a secondary coil 14 with a center tap 16 and end terminals 18 and 20. The end terminal 20 leads to a common junction 22 for a pair of branch circuits, one of which serially includes the actuating coil 24 of a safety valve 24 SV, a silicon controlled rectifier (SCR) 26 and a comon junction 28 leading to a common junction 30, one side of which is connected to the secondary end terminal 18. The other branch circuit from common junction 22 serially includes a four layer semiconductor switch or Shockley diode 32, a common junction 34, a positive temperature characteristic (PTC) thermistor 36, a common junction 38, a variable resistance 40, a negative temperature (NTC) thermistor 42 and the common junction 28; the common junction 38 is also connected to the gate electrode of the SCR 26 which has its anode and cathode connected to the coil 24 and the common junction 28, respectively. A parallel circuit between the common junctions 34 and 28 serially includes a common junction 44, a blocking diode 46 and the electric coil 48 of a pilot valve 48 PV. A parallel circuit includes the common junction 44 includes the electric coil 50 of an automatic valve 50 AV and a terminal 52 for connection to a room or space thermostat, indicated generally at 54.

The electric circuitry for the thermostat 54 includes a common junction 56 having one side connected to the terminal 52 and a pair of branch circuits, one of which serially includes a variable resistance 58, a common junction 60, and a negative temperature characteristic (NTC) thermistor 62 connected to the common junction 30. The other branch circuit includes an SCR 64 having its anode connected to the common junction 56 and its cathode connected to the center tap 16 of the secondary winding 14; the gate electrode of the SCR 64 is connected to the common junction 60.

The various control valves controlled by the above circuitry are located within control apparatus indicated generally at 66 having an inlet flow passage 68 connected to a suitable source of fuel such as a main gas supply; the inlet 68 is controlled by a manually operated valve 70 which is rotated between on-off pilot positions. As is well known in the art, when the manual valve 70 is in its "pilot" position, communication is established between the inlet 68 and a pilot flow passage 72; when in its "on" position communication is established between the inlet 68 and both the pilot flow passage 72 and a main flow passage 74. The main flow passage 74 is serially controlled by the safety valve 24 SV and the automatic valve 50 AV, downstream of which a main outlet 76 is connected to a main burner MB; the pilot flow passage 72 is controlled by the pilot valve 48 PV, downstream of which a pilot outlet 78 is connected to a pilot burner PB located in igniting proximity to the main burner MB.

While the above arrangement is applicable for use in a variety of condition control systems, such as a temperature control system for heating or cooling systems, it will be described in connection with a temperature control system for a forced air heating system. Such a heating system includes a furnace, indicated generally at 80, having a burner box 82 in which the main and pilot burners MB and PB are fixed, and which has a suitable flue opening 84 whereby the products of combustion are vented to the atmosphere. Air is drawn into a return air conduit 86 and through an air filter 88 by means of a blower 90 from which it is expelled into the furance plenum chamber 92 and forced into the warm air conduit 94 leading to the space being heated, which space includes the thermostat 54. The blower 90 includes an electric motor, the terminals of which are connected across the main power lines leading to the primary winding 12 of the transformer 10; a switch 96 is serially connected to the motor of blower 90 for on-off operation thereof. The blower motor switch 96 may be actuated in accordance with many systems well known in the art, such as to conform to the "on" position of the manual valve 70. In addition, the manual valve 70 conventionally includes an interlock feature (not shown) whereby, when a pilot flow therethrough is permitted for igniting the pilot burner PB, there is no main flow of fuel.

To commence operation of the above system, the manual valve 70 is rotated to its "pilot" position wherein opening of the pilot valve 48 PV is permitted as by a mechanical reset button (not shown); the pilot flow of fuel to the pilot burner PB is then ignited by any siutable means, such as a match. The flame at the pilot burner PB impinges on the Shockley diode 32 which becomes conductive and remains conductive as long as there is a flame at the ilot burner PB. As soon as the diode 32 is heated, the reset button may be released but the pilot valve 48 PV will remain open because its electrical actuating coil 48 is energized by a circuit traced from the secondary end terminal 20 through the junction 22, the conducting diode 32, the junction 34, the junction 44, the blocking diode 46, the coil 48, the junction 28 and the junction 30 to the secondary end terminal 18.

By using a center tap step-down transformer 10, the 110 volts across the primary winding is stepped down to 24 volts across the end terminals 18 and 20 of the secondary winding 14, with 12 volts being provided by the center tap 16 and one of the end terminals. Thus, the pilot valve coil 24 operates across the total secondary voltage, 24 volts, of the transformer 10.

Assuming now that the variable resistance 58 is set by its dial to a setting corresponding to a desired temperature, e.g., 70° F., and that there is a demand for heat as sensed by the NTC thermistor 62, the voltage divider network in the thermostat 54 operates to trigger the SCR 64. Thus, when the SCR 64 is conductive, an energizing circuit for the automatic valve coil 50 is traced from the secondary end terminal 20 through the junction 22, conducting diode 32, junction 34, junction 44, coil 50, terminal 52, thermostat terminal 56 and the conducting SCR 64 to the secondary center tap 16. Accordingly, the automatic valve coil 50 is energized by a 12 volt circuit to open the automatic valve 50 AV to permit a flow of fuel to the main burner MB where it is ignited by the flame of the pilot burner PB. The automatic valve 50 AV will cycle between on and off conditions in response to the thermostatic cycling of the space thermostat 54.

As long as there is no abnormal temperature condition, the control circuit will cycle between normal temperature limits and provide the main burner MB with thermostatic operation to maintain the heat in the space at a desired temperature. During such normal operation, the safety valve 24 SV remains open because its electric coil 24 is energized by a 24 volt circuit traced from secondary end terminal 20, junction 22, coil 24, conducting SCR 26, junction 28 and junction 30 to secondary end terminal 18.

The SCR 26 remains conductive as long as its gate voltage is above a predetermined value as set by the variable resistance 40. A voltage divider circuit between the junctions 34 and 28 (FIG. 1) includes the PTC thermistor 36, the variable resistance 40 and the NTC thermistor 42; thus, the triggering voltage on the gate electrode of SCR 26 is controlled with respect to temperature sensed by the PTC thermistor 36. In the described embodiment, the PTC thermistor 36 is located in the plenum chamber 92 of the furnace 80 so that it will sense an abnormal temperature condition therein. Occurrence of an excessively high temperature condition in the plenum chamber 92 increases the resistance of the PTC thermistor 36 so that the voltage drop thereacross is great enough to prevent triggering of the SCR 26 whereupon it is rendered non-conductive and the safety valve 24 SV is deenergized and closes the main flow passage 74.

When the temperature condition in the plenum chamber 92 returns to normal, the PTC thermistor 36 will decrease in resistance and sufficient voltage is supplied to the gate of the SCR 26 for triggering the same; as soon as the SCR 26 is conducting, the safety valve coil 24 is energized and the system is returned to normal thermostatic operation under the control of the space thermostat 54. The above arrangement has the particular advantage of being automatically reset when the abnormal temperature condition is corrected and does not require any manual reset device nor any complex switching relays for a reset operation.

The NTC thermistor 42 is utilized to compensate for ambient temperature conditions affecting the triggering voltage of SCR 26. Since the gate-to-cathode voltage necessary to trigger an SCR is decreased with an increase in ambient temperature, the NTC thermistor 42 is provided in the gate-to-cathode path so that an increase in ambient temperature causes a decrease in the resistance thereby compensating for the changed triggering voltage of the SCR 26.

When the end terminal 20 in FIG. 1 is positive with respect to end terminal 18 as during the positive half cycle, the SCR 26 and SCR 64 will be properly biased for conduction; on the negative half cycle, the SCR 26 and SCR 64 will be prevented from conduction by the reverse potential applied to their anodes and cathodes. As long as the Shockley diode 32 senses a flame at the pilot burner PB, it will be in a low impedance state and current will pass. Thus, on the positive half cycle, the voltage divider circuit between junctions 34 and 28 provides the potential on the gate of the SCR 26 for controlling its conduction.

If the flame at the pilot burner PB should be extinguished for any reason, the Shockley diode 32 will be in its high impedance state and no current will pass. Since the Shockley diode 32 is ahead of the junction 34, the coils 48 and 50 will be deenergized and the valves 48 PV and 50 AV will be closed; furthermore, since the Shockley diode 32 also controls the PTC thermistor 36, there will be no voltage applied to the gate of the SCR 26 which will be rendered non-conductive to deenergize the coil 24 and close the safety valve 24 SV. With such an arrangement, extinguishment of the flame at the pilot burner PB causes 100% closure of all flow passages. To commence operation of the system, the relighting procedure of the pilot burner PB must be followed as outlined above.

The temperature control system of the present invention may be constructed in a less sophisticated manner by utilizing conventional, commercially available electromechanical devices for the high temperature responsive means, the thermostat and the flame detector utilized in the embodiment of FIGS. 1, 2, and 3. To construct such a system a high temperature electromechanical switch is connected in series with the actuating coil for the safety valve and an electromechanical thermostatic switch is connected in series with the activating coil for the automatic valve to perform the functions of SCR 26 and SCR 64, respectively. The above series combinations are connected in parallel, and the parallel combination is connected in series with a flame switch and a source of electrical power.

In operation the thermostatic switch will control the automatic valve to control the flow of fuel to the main burner in response to the temperature in the area being heated; and, if an abnormally high temperature is sensed by the high temperature switch, the safety valve will close to prevent any further fuel flow to the main burner. When the abnormally high temperature condition has subsided to close the high temperature switch and open the safety valve, the system will recycle because the thermostatic switch continues its control of the automatic valve during safety shutdown. If the flame at the pilot burner is extinguished for any reason, the flame switch will open to deenergize the activating coils for the safety valve and the automatic valve and close them.

If total shutdown is desired upon pilot flame failure, an activating coil for a pilot valve is connected in series with the flame switch and the source of electrical power so that opening of the flame switch closes the pilot valve along with the safety valve and the automatic valve. Of course, if a continuous pilot flow is desired, no automatic pilot valve is necessary.

Inasmuch as the present invention is subject to many modifications, variations and changes in details, it is intended that all matter contained in the foregoing description or shown in the accompanying drawing be interpreted as illustrative and not in a limiting sense.

What is claimed is:

1. In a temperature control system for burner apparatus, the combination comprising
    main burner means and pilot burner means located in igniting proximity thereto,
    pilot control means for controlling operation of said pilot burner means,
    automatic control means for controlling operation of said main burner means,
    thermostatic means electrically connected to said automatic control means for actuation thereof whereby said main burner means is cycled thermostatically,
    safety control means for controlling operation of said main burner means independently of said automatic control means,
    abnormal temperature responsive means for said safety control means whereby said main burner means is inoperative in response to an abnormal temperature condition, and
    electrical circuit means including semiconductor switch means electrically connected to said safety control means and having a gate electrode controlled by said abnormal temperature responsive means whereby said safety control means is actuated in accordance with voltage at the gate electrode.

2. The invention as recited in claim 1 wherein said abnormal temperature responsive means includes variable resistance means for adjusting the gate voltage at which said semiconductor switch means is rendered non-conductive.

3. The invention as recited in claim 2 wherein said abnormal temperature means includes thermistor means controlling the gate voltage to said semiconductor switch means whereby said safety control means is deenergized in response to an abnormal temperature condition and is automatically reenergized when the abnormal temperature condition decreases.

4. The invention as recited in claim 1 wherein said abnormal temperature responsive means comprises a voltage divider circuit connected across said electric circuit means to control the gate voltage of said semiconductor switch means.

5. The invention as recited in claim 4 wherein said voltage divider circuit includes a variable resistance connected to the gate electrode of said semiconductor switch means and thermistor means being conductive in response to the abnormal temperature condition.

6. The invention as recited in claim 5 wherein said thermistor means comprises a positive temperature characteristic thermistor.

7. The invention as recited in claim 6 wherein said thermistor means further comprises a negative temperature characteristic thermistor to compensate for ambient temperature variations affecting said semiconductor switch means.

8. The invention as recited in claim 1 wherein said semiconductor switch means comprises a silicon controlled rectifier serially connected to said safety control means and said abnormal temperature responsive means comprises voltage divider circuit means connected across said electric circuit means to control the gate electrode of said silicon controlled rectifier.

9. The invention as recited in claim 8 wherein said voltage divider circuit means includes thermistor means connected to the gate electrode whereby said silicon controlled rectifier is conductive when said thermistor means senses normal temperature conditions and is non-conductive when said thermistor means senses an abnormal temperature condition.

10. The invention as recited in claim 9 wherein said voltage divider circuit means further includes a variable resistance for adjusting the gate voltage at which said silicon controlled rectifier is rendered non-conductive.

11. The invention as recited in claim 9 wherein said pilot control means comprises an energizing circuit having flame sensor means whereby said energizing circuit is operative only when a flame exists at the pilot burner means.

12. The invention as recited in claim 11 wherein said automatic control means is electrically connected to said energizing circuit whereby said automatic control means may be actuated only when a flame exists at the pilot burner means.

13. The invention as recited in claim 11 wherein said flame sensor means is electrically connected to said voltage divider circuit means whereby voltage to the gate electrode of said silicon controlled rectifier is supplied only when a flame exists at the pilot burner means.

14. The invention as recited in claim 11 wheren said flame sensor means comprises a four layer switching diode.

15. The invention as recited in claim 14 wherein said four layer switching diode is electrically connected to said voltage divider means and to said automatic control means whereby said safety control means and said automatic control means may be respectively actuated only when said four layer switching diode is rendered conductive by a flame at the pilot burner means.

16. In a temperature control system for burner apparatus, the combination comprising
    main burner means and pilot burner means in igniting proximity thereto,
    main conduit means adapted to supply a main fuel flow to said main burner means,
    pilot conduit means adapted to supply a fuel flow to said pilot burner means,
    automatic valve means in said main conduit means movable between on-off positions for controlling the main fuel flow,
    an electrical actuator for said automatic valve means,
    thermostatic means electrically connected to said electric actuator causing actuation of said automatic valve means in response to predetermined normal temperature variations,
    safety valve means in said main conduit means in series with said automatic valve means and movable between on-off positions for controlling the main fuel flow independently of said automatic valve means,
    an electric operator for said safety valve means,
    abnormal temperature responsive means electrically connected to said electric operator causing operation of said safety valve means to its off position in response to predetermined abnormal temperature conditions, said abnormal temperature sensing means being located at a position remote from said thermostatic means to sense temperatures other than said predetermined normal temperature variations, and electrical energizing means connected to said electric actuator and to said electric operator including a circuit for said electric actuator and a parallel circuit for said electric operator whereby said automatic valve means and said safety valve means are independently controlled permitting said safety valve means to be reset automatically to its on position upon removal of the abnormal temperature condition.

17. The invention as recited in claim 16 wherein said electrical energizing means includes a flame sensor disposed within flame sensing proximity of said pilot burner means, said flame sensor being electrically connected with said electric actuator and said electric operator whereby failure of said flame sensor to sense a flame causes movement of said automatic valve means and said safety valve means to their off positions.

References Cited
UNITED STATES PATENTS

| | | | |
|---|---|---|---|
| 1,951,663 | 3/1934 | Kriechbaum | 236—11 |
| 2,292,830 | 8/1942 | Gauger | 236—9 X |
| 2,328,280 | 8/1943 | Jones | 236—9 X |
| 2,331,476 | 10/1943 | Jones | 236—9 |
| 2,596,290 | 5/1952 | Ryder et al. | 236—11 |
| 2,308,555 | 1/1943 | Tate. | |
| 3,236,450 | 2/1966 | Bixby. | |
| 3,272,432 | 9/1966 | Davidson. | |

EDWARD J. MICHAEL, Primary Examiner